US012647805B2

(12) United States Patent
Xiong

(10) Patent No.: US 12,647,805 B2
(45) Date of Patent: Jun. 2, 2026

(54) START CONTROL METHOD FOR MEASUREMENT FOR NON-SERVING CELL, COMMUNICATION DEVICE, AND STORAGE MEDIUM

(71) Applicant: BEIJING XIAOMI MOBILE SOFTWARE CO., LTD., Beijing (CN)

(72) Inventor: Yi Xiong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 303 days.

(21) Appl. No.: 18/283,971

(22) PCT Filed: Mar. 31, 2021

(86) PCT No.: PCT/CN2021/084607
§ 371 (c)(1),
(2) Date: Sep. 25, 2023

(87) PCT Pub. No.: WO2022/205145
PCT Pub. Date: Oct. 6, 2022

(65) Prior Publication Data
US 2024/0172015 A1      May 23, 2024

(51) Int. Cl.
*H04W 24/08* (2009.01)
*H04W 4/021* (2018.01)

(52) U.S. Cl.
CPC .......... *H04W 24/08* (2013.01); *H04W 4/021* (2013.01)

(58) Field of Classification Search
CPC .............................. H04W 24/08; H04W 4/021
See application file for complete search history.

(56) References Cited

U.S. PATENT DOCUMENTS

| | | | | |
|---|---|---|---|---|
| 12,520,267 B2 * | 1/2026 | Hong | .................... | H04W 64/00 |
| 2016/0353341 A1 * | 12/2016 | Hamabe | ............. | H04W 36/302 |
| 2019/0182000 A1 * | 6/2019 | Futaki | ................... | H04L 5/0092 |
| 2020/0120527 A1 * | 4/2020 | Fan | ........................ | H04W 72/04 |
| 2020/0169341 A1 * | 5/2020 | Hwang | ............... | H04B 17/318 |
| 2022/0104082 A1 * | 3/2022 | Sedin | ............... | H04W 36/0085 |

(Continued)

FOREIGN PATENT DOCUMENTS

| | | |
|---|---|---|
| CN | 103974316 A | 8/2014 |
| CN | 111629397 A | 9/2020 |

(Continued)

OTHER PUBLICATIONS

PCT/CN2021/084607, International Search Report dated Dec. 30, 2021, 2 pages.

(Continued)

*Primary Examiner* — Kenny S Lin
(74) *Attorney, Agent, or Firm* — Cozen O'Connor

(57) ABSTRACT

A start control method for a measurement for a non-serving cell, performed by a terminal device, includes: obtaining start configuration information from a network device or a protocol convention; determining a corresponding start threshold according to location information and the start configuration information or determining a corresponding start threshold according to time information and the start configuration information; and determining whether to start the measurement for the non-serving cell according to the start threshold.

20 Claims, 5 Drawing Sheets

S301
obtaining start configuration information from a network device or a protocol convention S302
determining a corresponding start threshold according to location information and the start configuration information, wherein the location information comprises location information of the terminal device and location information of a reference point of a serving cell where the terminal device is located S303
determining whether to start the measurement for the non-serving cell according to the start threshold

(56)                  References Cited

U.S. PATENT DOCUMENTS

| | | | |
|---|---|---|---|
| 2023/0269617 A1 * | 8/2023 | Li | H04W 48/16 |
| | | | 370/252 |
| 2023/0275652 A1 * | 8/2023 | Wu | H04W 36/322 |
| | | | 370/252 |
| 2023/0413082 A1 * | 12/2023 | Yang | H04W 24/08 |

FOREIGN PATENT DOCUMENTS

| | | | | | |
|---|---|---|---|---|---|
| JP | 2022544586 | A | * | 10/2022 | H04W 74/0866 |
| WO | WO-2014121697 | A1 | * | 8/2014 | H04W 24/10 |
| WO | WO-2025166627 | A1 | * | 8/2025 | |

OTHER PUBLICATIONS

European Patent Application No. 21933810.0Search Report dated Dec. 19, 2024, 14 pages.

Chinese Patent Application No. 202180000763.4 First Office Action dated Dec. 31, 2024 with English translation, 21 pages.

Catt, "Initial Discussion for Idle and Inactive Mode in NTN" 3GPP TSG-RAN WG2 Meeting #111 electronic, R2-2006628, Aug. 2020, 6 pages.

Huawei et al., "Discussion on cell reselection in NTN", 3GPP TSG RAN WG2 #113-e, R2-2101000, Jan. 2021, 3 pages.

Ericsson, "RRM Measurement Requirements", 3GPP TSG-RAN WG4 Meeting #98-e, R4-2101866, Jan. 2021, 6 pages.

Huawei et al., "Discussion on RRC_IDLE mode issues in NTN" 3GPP TSG RAN WG2 #112-e, R2-2009637, Nov. 2020, 3 pages.

LG Electronics Inc., "Contents of ephemeris information and remaining idle mode issues", 3GPP TSG-RAN WG2 Meeting #113-e, R2-2100579, Feb. 2021, 4 pages.

* cited by examiner

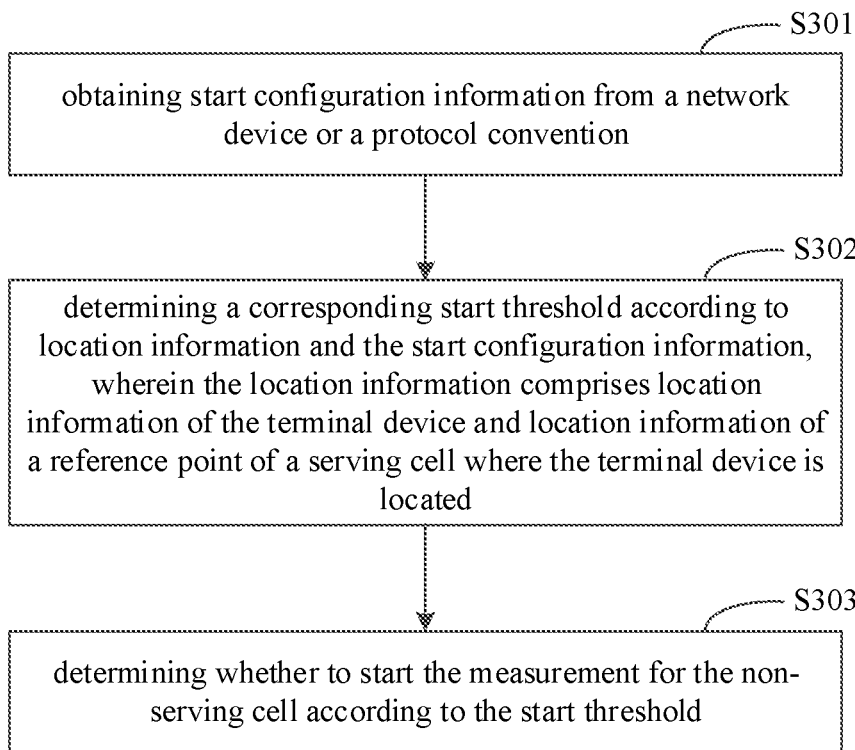

S301 obtaining start configuration information from a network device or a protocol convention

S302 determining a corresponding start threshold according to location information and the start configuration information, wherein the location information comprises location information of the terminal device and location information of a reference point of a serving cell where the terminal device is located

S303 determining whether to start the measurement for the non-serving cell according to the start threshold

FIG. 3

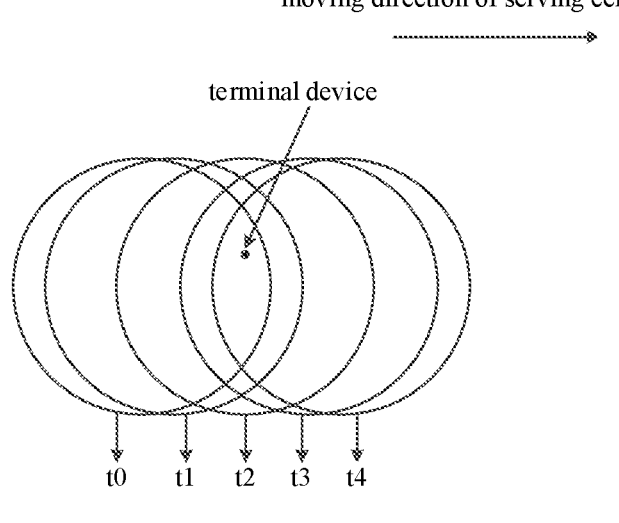

moving direction of serving cell terminal device t0    t1    t2    t3    t4

FIG. 4

~ S701
sending start configuration information to a terminal device,
wherein the start configuration information is used to
determine a corresponding start threshold
FIG. 7
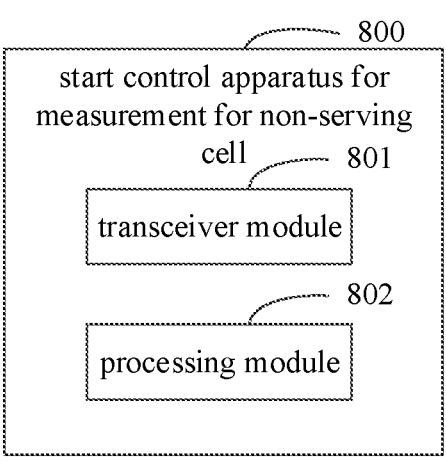
FIG. 8
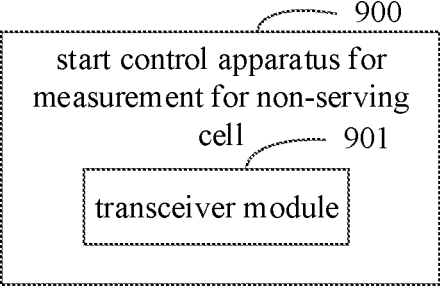
FIG. 9

START CONTROL METHOD FOR MEASUREMENT FOR NON-SERVING CELL, COMMUNICATION DEVICE, AND STORAGE MEDIUM

CROSS-REFERENCE TO RELATED APPLICATION

This application is a national phase of International Application No. PCT/CN2021/084607, filed on Mar. 31, 2021, the entire content of which is incorporated herein by reference.

TECHNICAL FIELD

The disclosure relates to the field of communication technologies, and more particularly, to a start control method for a measurement for a non-serving cell, and an associated communication device and storage medium.

BACKGROUND

A terminal device has mobility. It needs to measure a non-serving cell when the terminal device is about to leave a coverage range of a serving cell, to ensure stability when the terminal device connects to network. At present, in a non-terrestrial network (NTN), differences on reference signal receiving powers (RSRPs) and reference signal receiving qualities (RSRQ) between a terminal device in a cell center and a terminal device at a cell edge are small, that is, a far-near effect is not apparent. Therefore, it is difficult to determine whether the terminal device is in the coverage range of the serving cell according to a signal strength of the terminal device. Further it is also difficult to determine whether to perform a non-serving cell measurement.

SUMMARY

In a first aspect, the disclosure provides a start control method for a measurement for a non-serving cell. The method is performed by a terminal device. The method includes: obtaining start configuration information from a network device or a protocol convention; determining a corresponding start threshold according to location information and the start configuration information or determining a corresponding start threshold according to time information and the start configuration information; and determining whether to start the measurement for the non-serving cell according to the start threshold.

In a second aspect, the disclosure provides another start control method for a measurement for a non-serving cell. The method is performed by a network device. The method includes: sending start configuration information to a terminal device, in which the start configuration information is used to determine a corresponding start threshold.

In a third aspect, the disclosure provides a communication device. The communication device includes a processor. When the processor calls a computer program in a memory, the method described in the first aspect is performed.

BRIEF DESCRIPTION OF THE DRAWINGS

To more clearly illustrate technical solutions in embodiments of the disclosure or in the related art, the accompanying drawings required in the embodiments of the disclosure or in the related art will be described below.

FIG. 3 is a schematic flowchart of another start control method for a measurement for a non-serving cell according to some embodiments of the disclosure.

FIG. 4 is a schematic flowchart of a start control method for a measurement for a non-serving cell according to some embodiments of the disclosure.

FIG. 7 is a schematic flowchart of another start control method for a measurement for a non-serving cell according to some embodiments of the disclosure.

FIG. 8 is a schematic block diagram of a start control apparatus for a measurement for a non-serving cell according to some embodiments of the disclosure.

FIG. 9 is a schematic block diagram of another start control apparatus for a measurement for a non-serving cell according to some embodiments of the disclosure.

DETAILED DESCRIPTION

Reference will now be made in detail to embodiments of the disclosure and examples of the embodiments of the disclosure are illustrated in the accompanying drawing, in which the same or similar numbers represent the same or similar elements or elements having the same or similar functions throughout. The embodiments described below with reference to the accompanying drawings are exemplary, are intended to be used to explain the disclosure, but should not be construed as a limitation to the disclosure.

For ease of understanding, terms involved in the disclosure are first introduced.

1, Non-Terrestrial Network (NTN)

In the NTN, differences on reference signal receiving powers (RSRPs) and reference signal receiving qualities (RSRQ) between a terminal device in a cell center and a terminal device at a cell edge are small, that is, a far-near effect is not apparent. A transmission delay of the NTN is relatively large and there is a propagation delay difference between different satellites.

2, Radio Resource Control (RRC)

It refers to manage, control and schedule wireless resources through certain strategies and means. Under requirements of service quality, limited wireless network resources are fully utilized as much as possible to ensure that the planned coverage area is reached and the service capacity and the resource utilization are improved as much as possible.

To better understand a start control method for a measurement for a non-serving cell, provided in embodiments of the disclosure, the communication system used in the embodiments of the disclosure is first described below.

Figure 1:
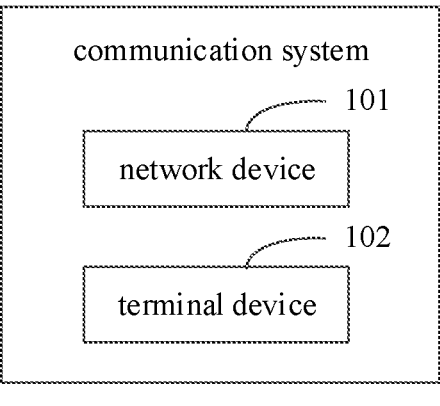
FIG. 1 is a schematic diagram of an architecture of a communication system according to some embodiments of the disclosure.

As illustrated in FIG. 1, FIG. 1 is a schematic diagram of an architecture of a communication system according to some embodiments of the disclosure. The communication system includes, but is not limited to, a network device and a terminal device. The number and shapes of devices in FIG. 1 are for examples and do not constitute limitations to the embodiments of the disclosure. In practical applications, two or more network devices may be included and two or more terminal devices may be included. The communication system in FIG. 1 includes one network device 101 and one terminal device 102 as an example.

It should be noted that the technical solutions of the embodiments of the disclosure may be applied to various communication systems. For example: a long term evolution (LTE) system, a fifth generation (5G) mobile communication system, a 5G new radio (NR) system, or other future new mobile communication systems.

The network device 101 in some embodiments of the disclosure is an entity on the network side for transmitting or receiving signals. For example, the network device 101 may be an evolved NodeB (eNB), a transmission reception point (TRP), a next generation NodeB (gNB) in an NR system, a base station in other future mobile communication systems, or an access node in a wireless fidelity (Wi-Fi) system. The embodiments of the disclosure do not limit the specific technology and specific device form adopted by the network device. The network device in the embodiments of the disclosure may include a central unit (CU) and a distributed unit (DU). The CU may also be called a control unit. By adopting a CU-DU structure, protocol layers of the network device such as the base station may be splitted, functions of some protocol layers are centrally controlled by the CU, functions of the remaining part or all the protocol layers are distributed in the DU, and the CU centrally controls the DU.

The terminal device 102 in some embodiments of the disclosure is an entity on the user side for transmitting or receiving signals, such as a mobile phone. The terminal device may also be referred to as a terminal, a user equipment (UE), a mobile station (MS), a mobile terminal (MT) or the like. The terminal device may be a car with a communication function, a smart car, a mobile phone, a wearable device, a tablet computer, a computer with a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home or the like. The embodiments of the disclosure do not limit the specific technology and specific device form adopted by the terminal device.

It should be understood that the communication system described in the embodiments of the disclosure is for the purpose of illustrating the technical solutions of the embodiments of the disclosure more clearly and does not constitute a limitation on the technical solutions of the embodiments of the disclosure. For those skilled in the art, with the evolution of the system architecture and the emergence of the new service scenario, the technical solutions of the embodiments of the disclosure are also applicable to similar technical problems.

A start control method and a start control apparatus for a measurement for a non-serving cell in the disclosure will be described in detail below with reference to the accompanying drawings.

Figure 2:
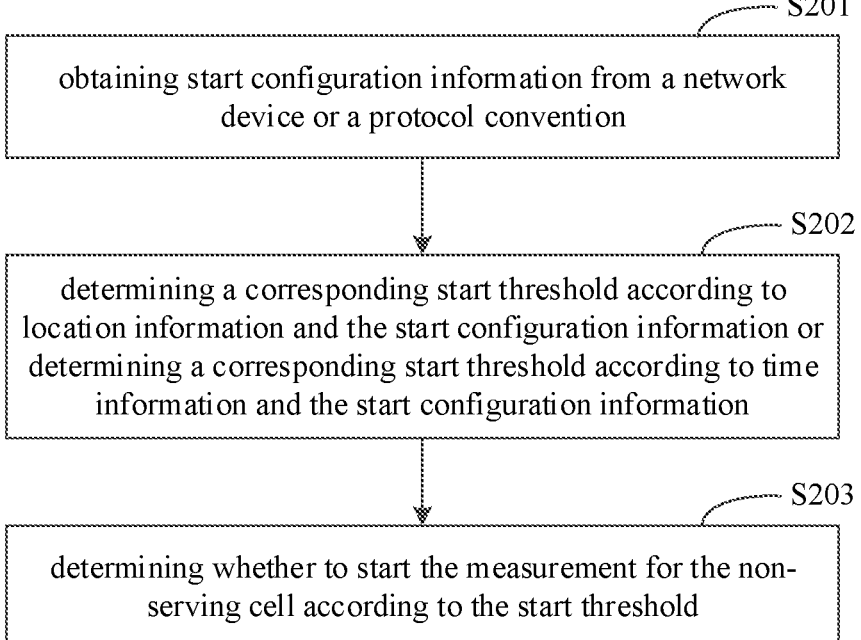
FIG. 2 is a schematic flowchart of a start control method for a measurement for a non-serving cell according to some embodiments of the disclosure.

FIG. 2 is a schematic flowchart of a start control method for a measurement for a non-serving cell according to some embodiments of the disclosure. The method is performed by a terminal device. As illustrated in FIG. 2, the start control method for a measurement for a non-serving cell includes the following steps.

S201, start configuration information from a network device or a protocol convention is obtained.

The terminal device has mobility. It needs to measure a non-serving cell when the terminal device is about to leave a coverage range of a serving cell, to ensure stability when the terminal device connects to network. At present, in a NTN, differences on RSRPs and RSRQ between a terminal device in a cell center and a terminal device at a cell edge are small, that is, a far-near effect is not apparent. Therefore, it is difficult to determine whether the terminal device is in the coverage range of the serving cell according to a signal strength of the terminal device and further it is difficult to determine whether to perform a non-serving cell measurement. In the related art, there is unnecessary non-serving cell measurement, which leads to a throughput loss and larger energy consumption of the terminal device.

In some embodiments of the disclosure, the terminal device may obtain the start configuration information from the network device or the start configuration information agreed by the protocol. The terminal may receive a broadcast or a signaling sent by the network device to obtain the start configuration information. For example, the terminal device may receive a RRC reconfiguration message sent by the network device. The RRC reconfiguration message carries the start configuration information. Correspondingly, the terminal device may obtain the start configuration information from the RRC reconfiguration message. Alternatively, the terminal device may pre-agreed with the network device on a protocol including the content such as the start configuration information, and the terminal device may obtain the start configuration information according to the convention. For example, the terminal device may obtain the start configuration information from a measurement configuration in the protocol.

In embodiments, the start configuration information includes at least one of: a plurality of start thresholds; a calculation function of the start threshold; or a correspondence between a plurality of pieces of coverage area information of cells and a plurality of start thresholds.

In an implementation manner, the start configuration information may include the plurality of start thresholds. The corresponding start threshold may be determined from the plurality of start thresholds in the start configuration information.

In an implementation manner, the start configuration information includes one start threshold only. The one start threshold in the start configuration information may be determined as the corresponding start threshold.

In an implementation manner, the start configuration information may include the calculation function of the start threshold. The corresponding start threshold may be determined according to the calculation function of the start threshold in the start configuration information.

In an implementation manner, the start configuration information may include the correspondence between a plurality of pieces of coverage area information of cells and a plurality of start thresholds. The corresponding start threshold may be determined according to the correspondence between a plurality of pieces of coverage area information of cells and a plurality of start thresholds in the start configuration information.

S202, a corresponding start threshold is determined according to location information and the start configuration information or a corresponding start threshold is determined according to time information and the start configuration information.

In some embodiments of the disclosure, determining the corresponding start threshold may include the following two possible implementation manners.

Manner 1: a corresponding start threshold is determined according to location information and the start configuration information.

In some embodiments of the disclosure, the influence of the location information and the start configuration information on the start threshold may be considered, so that the obtained start threshold is more accurate. It should be noted that, in some embodiments of the disclosure, the location information includes but is not limited to a form such as longitude and latitude or the like, which are not limited herein.

In an implementation manner, the location information includes at least one of: location information of the terminal device; location information of a serving cell where the terminal device is located; or ephemeris information of a serving satellite corresponding to the serving cell. It should be noted that the serving cell refers to a cell to which the terminal device is currently connected and the serving satellite refers to a satellite to which the serving cell is currently connected. The terminal device may obtain at least one of the location information of the serving cell and the ephemeris information of the serving satellite by receiving a broadcast or signaling sent by the network device.

In an implementation manner, the location information of the serving cell includes at least one of: coverage area information of the serving cell; location information of a reference point of the serving cell; or location information of a reference line of the serving cell.

The coverage area information of the serving cell may include at least one of: a circle center and a radius of a circular area corresponding to the serving cell, in which the circle center is the center of the serving cell and the radius is used to indicate a size of the serving cell; or a set of coordinates for indicating boundaries of the serving cell.

The reference point of the serving cell may include the center of the serving cell.

The reference line of the serving cell may include a straight line perpendicular to a moving direction of the serving cell.

The reference line of the serving cell may pass through the center of the serving cell.

In an implementation manner, determining the corresponding start threshold according to the location information and the start configuration information may include determining the start threshold from the plurality of start thresholds in the start configuration information according to the location information. It may be understood that sizes of the plurality of start thresholds in the start configuration information are different and one start threshold may be selected from the plurality of start thresholds in the start configuration information according to the location information as the determined start threshold. Therefore, when the start configuration information includes the plurality of start thresholds, this manner may determine the start threshold from the plurality of start thresholds in the start configuration information according to the location information.

In an implementation manner, determining the corresponding start threshold according to the location information and the start configuration information may include determining the start threshold according to the location information and the calculation function of the start threshold in the start configuration information. It may be understood that the location information may be substituted into the calculation function of the start threshold in the start configuration information to calculate the start threshold. Therefore, when the start configuration information includes the calculation function of the start threshold, this manner may determine the start threshold according to the location information and the calculation function of the start threshold in the start configuration information.

In an implementation manner, determining the corresponding start threshold according to the location information and the start configuration information may include determining the start threshold according to the location information and the correspondence between a plurality of pieces of coverage area information of cells and a plurality of start thresholds in the start configuration information. It may be understood that, different coverage area information may correspond to different start thresholds. Therefore, when the start configuration information includes the correspondence between a plurality of pieces of coverage area information of cells and a plurality of start thresholds, this manner may determine the start threshold according to the location information and the correspondence between a plurality of pieces of coverage area information of cells and a plurality of start thresholds in the start configuration information.

Determining the start threshold according to the location information and the correspondence between a plurality of pieces of coverage area information of cells and a plurality of start thresholds in the start configuration information may include: determining coverage area information of a serving cell where the terminal device is located according to location information of the terminal device; and determining the start threshold corresponding to a coverage area where the terminal device is located according to the coverage area information where the terminal device is located and the correspondence between a plurality of pieces of coverage area information of cells and a plurality of start thresholds.

For example, the correspondence between a plurality of pieces of coverage area information of cells and a plurality of start thresholds includes: coverage area information A corresponds to start threshold TH1 and coverage area information B corresponds to start threshold TH2. The coverage area information of the serving cell where the terminal device is located is determined according to the location information of the terminal device to be A and the start threshold is determined corresponding to the coverage area where the terminal device is located to be TH1.

Manner 2: a corresponding start threshold is determined according to time information and the start configuration information.

In some embodiments of the disclosure, the influence of the time information and the start configuration information on the start threshold may be considered, so that the obtained start threshold is more accurate.

In an implementation manner, the time information includes at least one of: a start moment and an end moment that the serving cell serves the terminal device; a duration that the serving cell serves the terminal device; or a remaining duration that the serving cell serves the terminal device. It should be noted that the start moment and the end moment that the serving cell serves the terminal device includes the start moment that the serving cell serves the terminal device and the end moment that the serving cell serves the terminal device. The remaining duration that the serving cell serves the terminal device may include a duration of the terminal device reaching the boundary of the serving cell.

The time information may be determined according to the location information of the terminal device and the location information of the serving cell. It may be understood that, it may be determined whether the terminal device is connected to the serving cell (that is, whether the serving cell serves the terminal device) according to the location information of the terminal device and the location information of the serving cell and the time information may be determined. For example, when the terminal device is within the coverage area of the serving cell, it may be determined that the terminal device is connected to the serving cell (that is, the serving cell serves the terminal device). On the contrary, when the terminal device is not within the coverage area of the serving cell, it may be determined that the terminal device is not connected to the serving cell (i.e. the serving cell does not serve the terminal device).

The time information may be determined according to the location information of the terminal device, the coverage area information of the serving cell and the moving direction of the serving cell. It may be understood that the coverage area of the serving cell may be determined according to the coverage area information of the serving cell and the moving direction of the serving cell and then the time information may be determined according to the location information of the terminal device and the coverage area of the serving cell.

In an implementation manner, determining the corresponding start threshold according to the time information and the start configuration information may include determining the start threshold from the plurality of start thresholds in the start configuration information according to the time information. It may be understood that sizes of the plurality of start thresholds in the start configuration information are different and one start threshold may be selected from the plurality of start thresholds in the start configuration information according to the time information as the determined start threshold. Thus, when the start configuration information includes the plurality of start thresholds, the manner may determine the start threshold from the plurality of start thresholds in the start configuration information according to the time information.

In an implementation manner, determining the corresponding start threshold according to the time information and the start configuration information may include determining the start threshold according to the time information and the calculation function of the start threshold in the start configuration information. It may be understood that the time information may be substituted into the calculation function of the start threshold in the start configuration information to calculate the start threshold. Therefore, when the start configuration information includes the calculation function of the start threshold, this manner may determine the start threshold according to the time information and the calculation function of the start threshold in the start configuration information.

S203, it is determined whether to start the measurement for the non-serving cell according to the start threshold.

In some embodiments of the disclosure, whether to start the measurement for the non-serving cell may be determined according to the start threshold.

In an implementation, the start threshold includes at least one of: a measurement-based start threshold; a distance-based start threshold; or a time-based start threshold.

It may be understood that different types of start thresholds may correspond to different start strategies for measurements for non-serving cells.

In an implementation, determining whether to start the measurement for the non-serving cell according to the start threshold includes at least one of the following possible implementations.

Implementation 1: a measurement result of a serving cell where the terminal device is located is greater than a corresponding measurement-based start threshold and it does not start the measurement for the non-serving cell.

In some embodiments of the disclosure, when the start threshold includes the measurement-based start threshold, the terminal device may obtain the measurement result of the serving cell where the terminal device is located and identify the size relationship between the measurement result and the corresponding measurement-based start threshold. When the measurement result is greater than the corresponding measurement-based start threshold, it indicates that the measurement result is relatively large and the measurement for the non-serving cell is not started.

Optionally, the measurement result of the serving cell where the terminal device is located may include, but is not limited to, a signal strength of the serving cell or the like, which is not limited herein.

Implementation 2: a distance from the terminal device to a center of the serving cell is less than a corresponding distance-based start threshold and it does not start the measurement for the non-serving cell.

In some embodiments of the disclosure, when the start threshold includes the distance-based start threshold, the terminal device may obtain the distance from the terminal device to the center of the serving cell and identify the size relationship between the distance and the corresponding distance-based start threshold. When the distance is less than the corresponding distance-based start threshold, it indicates that the distance between the terminal device and the center of the serving cell is small at this time, that is, the terminal device is closer to the center of the serving cell, and the measurement for the non-serving cell is not started.

Implementation 3: a distance from the terminal device to a corresponding serving satellite is less than the corresponding distance-based start threshold and it does not start the measurement for the non-serving cell.

In some embodiments of the disclosure, when the start threshold includes the distance-based start threshold, the terminal device may obtain the distance from the terminal device to the corresponding serving satellite and identify the size relationship between the distance and the corresponding distance-based start threshold. When the distance is less than the distance-based start threshold, it indicates that the distance between the terminal device and the serving satellite is small at this time, that is, the terminal device is close to the serving satellite, and the measurement for the non-serving cell is not started.

Implementation 4: a remaining duration that the serving cell serves the terminal device is greater than a corresponding time-based start threshold and it does not start the measurement for the non-serving cell.

In some embodiments of the disclosure, when the start threshold includes the time-based start threshold, the terminal device may obtain the remaining duration that the serving cell serves the terminal device and identify the size relationship between the remaining duration and the corresponding time-based start threshold. When the remaining duration is greater than the corresponding time-based start threshold, it indicates that the serving cell has a relatively long remaining duration to serve the terminal device at this time and the measurement for the non-serving cell is not started.

It may be understood that types of start thresholds may be one or more.

In an implementation manner, there are a plurality of types of start thresholds. For example, the start thresholds may include the distance-based start threshold and the time-based start threshold. At this time, determining whether to start the measurement for the non-serving cell according to the start threshold may include determining whether to start the measurement for the non-serving cell according to the correlation between the plurality of start thresholds and the start thresholds. The correlation between the plurality of start thresholds includes but is not limited to, "AND" operation, "OR" operation, "NOT" operation or the like.

For example, the start threshold may include the distance-based start threshold and the time-based start threshold and the correlation between the distance-based start threshold and the time-based start threshold is "AND". Then when it is determined to start the measurement for the non-serving cell according to the distance-based start threshold and it is determined to start the measurement for the non-serving cell according to the time-based start threshold, it is finally determined to start the measurement for the non-serving cell. On the contrary, when it is determined not to start the measurement for the non-serving cell according to the distance-based start threshold or it is determined not to start the measurement for the non-serving cell according to the time-based start threshold, it is finally determined not to start the measurement for the non-serving cell.

According to the start control method for a measurement for a non-serving cell, provided in the disclosure, the start configuration information from the network device or the protocol convention is obtained, the corresponding start threshold is determined according to the location information and the start configuration information or the corresponding start threshold is determined according to the time information and the start configuration information, and it is determined whether to start the measurement for the non-serving cell according to the start threshold. Therefore, the influence of the location information or the time information on the start threshold may be considered, so that the determined start threshold may be more accurate, thereby avoiding measurements for unnecessary non-serving cells and reducing the throughput loss and energy consumption of the terminal device.

FIG. 3 is a schematic flowchart of another start control method for a measurement for a non-serving cell according to some embodiments of the disclosure. The method is performed by the terminal device. As illustrated in FIG. 3, the start control method for a measurement for a non-serving cell includes the following steps.

S301, start configuration information from a network device or a protocol convention is obtained.

In some embodiments of the disclosure, step S301 may be implemented in any one of the embodiments of the disclosure, which is not limited in the embodiments of the disclosure and will not be described again.

S302, a corresponding start threshold is determined according to location information and the start configuration information. The location information includes location information of the terminal device and location information of a reference point of a serving cell where the terminal device is located.

In some embodiments of the disclosure, the corresponding start threshold may be determined according to the location information of the terminal device, the location information of the reference point of the serving cell where the terminal device is located, and the start configuration information, which may include at least one of the following possibilities implementations.

Implementation 1, a distance between the terminal device and the reference point of the serving cell where the terminal device is located is calculated according to the location information of the terminal device and the location information of the reference point, and the start threshold is determined from the plurality of start thresholds in the start configuration information according to a change of the distance.

In an implementation manner, the reference point of the serving cell is the center of the serving cell. The plurality of start thresholds may include a first measurement-based start threshold and a second measurement-based start threshold. The first start threshold is less than the second start threshold.

The start threshold is determined from the plurality of start thresholds in the start configuration information according to the change of the distance, which may include that when the distance at the current moment is smaller than the distance at the previous moment, it indicates that the distance between the terminal device and the center of the serving cell decreases with time and the first start threshold is determined as the start threshold, that is, when the distance between the terminal device and the center of the serving cell becomes smaller with time, the smaller value among the plurality of measurement-based start thresholds is determined as the start threshold.

The start threshold is determined from the plurality of start thresholds in the start configuration information according to the change of the distance, which may include that when the distance at the current moment is greater than the distance at the previous moment, it indicates that the distance between the terminal device and the center of the serving cell increases with time and the second start threshold is determined as the start threshold, that is, when the distance between the terminal device and the center of the serving cell becomes greater with time, the larger value among the plurality of measurement-based start thresholds is determined as the start threshold.

For example, as illustrated in FIG. 4, from time t0 to time t2, as the serving cell moves, the distance between the terminal device and the center of the serving cell decreases with time and the first start threshold may be determined as the start threshold. From time t2 to time t4, as the serving cell moves, the distance between the terminal device and the center of the serving cell increases with time and the second start threshold may be determined as the start threshold.

In an implementation manner, the reference point of the serving cell is the center of the serving cell. The plurality of start thresholds may include a third distance-based start threshold and a fourth distance-based start threshold. The third start threshold is greater than the fourth start threshold.

The start threshold is determined from the plurality of start thresholds in the start configuration information according to the change of the distance, which may include that when the distance at the current moment is smaller than the distance at the previous moment, it indicates that the distance between the terminal device and the center of the serving cell decreases with time and the third start threshold is determined as the start threshold, that is, when the distance between the terminal device and the center of the serving cell becomes smaller with time, the larger value among the plurality of distance-based start thresholds in the start configuration information is determined as the start threshold.

The start threshold is determined from the plurality of start thresholds in the start configuration information according to the change of the distance, which may include that when the distance at the current moment is greater than the distance at the previous moment, it indicates that the distance between the terminal device and the center of the serving cell increases with time and the fourth start threshold is determined as the start threshold, that is, when the distance between the terminal device and the center of the serving cell becomes greater with time, the smaller value among the plurality of distance-based start thresholds in the start configuration information is determined as the start threshold.

For example, continuing to take FIG. 4 as an example, from time t0 to time t2, as the serving cell moves, the distance between the terminal device and the center of the serving cell decreases with time and the third start threshold may be determined as the start threshold. From time t2 to time t4, as the serving cell moves, the distance between the terminal device and the center of the serving cell increases with time and the fourth start threshold may be determined as the start threshold.

Implementation 2, a vector formed by the terminal device and the reference point is calculated according to the location information of the terminal device and the location information of the reference point, and the start threshold from the plurality of start thresholds is determined according to the vector.

In an implementation manner, the reference point of the serving cell is the center of the serving cell. The plurality of start thresholds may include a first measurement-based start threshold and a second measurement-based start threshold. The first start threshold is smaller than the second start threshold. The vector starts from the reference point and ends at the terminal device.

The start threshold is determined from the plurality of start thresholds according to the vector, which may include that when a projection of the vector on a moving direction of the serving cell is positive, it indicates that the distance between the terminal device and the center of the serving cell decreases with time and the first start threshold is determined as the start threshold, that is, when the distance between the terminal device and the center of the serving cell becomes smaller with time, the smaller value among the plurality of measurement-based start thresholds is determined as the start threshold.

The start threshold is determined from the plurality of start thresholds according to the vector, which may include that when a projection of the vector on a moving direction of the serving cell is negative, it indicates that the distance between the terminal device and the center of the serving cell increases with time and the second start threshold is determined as the start threshold, that is, when the distance between the terminal device and the center of the serving cell becomes greater with time, the larger value among the plurality of measurement-based start thresholds is determined as the start threshold.

For example, continuing to take FIG. 4 as an example, from time t0 to time t2, as the serving cell moves, the projection of the vector on the moving direction of the serving cell is positive and the first start threshold may be determined as the start threshold. From time t2 to time t4, as the serving cell moves, the projection of the vector on the moving direction of the serving cell is negative and the second start threshold may be determined as the start threshold.

In an implementation manner, the reference point of the serving cell is the center of the serving cell. The plurality of start thresholds may include a third distance-based start threshold and a fourth distance-based start threshold. The third start threshold is greater than the fourth start threshold. The vector starts from the reference point and ends at the end device.

The start threshold is determined from the plurality of start thresholds according to the vector, which may include that when a projection of the vector on a moving direction of the serving cell is positive, it indicates that the distance between the terminal device and the center of the serving cell decreases with time and the third start threshold is determined as the start threshold, that is, when the distance between the terminal device and the center of the serving cell becomes smaller with time, the larger value among the plurality of distance-based start thresholds in the start configuration information is determined as the start threshold.

The start threshold is determined from the plurality of start thresholds according to the vector, which may include that when a projection of the vector on a moving direction of the serving cell is negative, it indicates that the distance between the terminal device and the center of the serving cell increases with time and the third start threshold is determined as the start threshold, that is, when the distance between the terminal device and the center of the serving cell becomes greater with time, the smaller value among the plurality of distance-based start thresholds in the start configuration information is determined as the start threshold.

For example, continuing to take FIG. 4 as an example, from time t0 to time t2, as the serving cell moves, the projection of the vector on the moving direction of the serving cell is positive and the third start threshold may be determined as the start threshold. From time t2 to time t4, as the serving cell moves, the projection of the vector on the moving direction of the serving cell is negative and the fourth start threshold may be determined as the start threshold.

Implementation 3, the vector formed by the terminal device and the reference point is calculated according to the location information of the terminal device and the location information of the reference point, and the start threshold is determined by adopting the calculation function of the start threshold in the start configuration information according to the vector.

In some embodiments of the disclosure, the vector formed by the terminal device and the reference point may be calculated according to the location information of the terminal device and the location information of the reference point and the start threshold may be determined according to the vector using the calculation function of the start threshold in the start configuration information. It may be understood that the vector may be substituted into the calculation function of the start threshold in the start configuration information to calculate the start threshold. Thus, the manner may determine the start threshold according to the vector and the calculation function of the start threshold in the start configuration information.

In an implementation manner, the start threshold may be calculated by using the calculation function of the start threshold according to the projection of the vector starting from the reference point and ending at the terminal device on the moving direction of the serving cell. It may be understood that, the projection may be substituted into the calculation function of the start threshold in the start configuration information to calculate the start threshold.

S303, it is determined whether to start the measurement for the non-serving cell according to the start threshold.

In some embodiments of the disclosure, step S303 may be implemented in any one of the embodiments of the disclosure, which is not limited in the embodiments of the disclosure and will not be described again.

Continuing to take FIG. 4 as an example, the plurality of start thresholds may include a first measurement-based start threshold and a second measurement-based start threshold. The first start threshold is smaller than the second start threshold. The first start threshold may be determined as the start threshold at time t1. When the measurement result of the serving cell where the terminal device is located at time t1 is greater than the first start threshold, the measurement for the non-serving cell is not started. At time t4, the second start threshold may be determined as the start threshold. When the measurement result of the serving cell where the terminal device is located at time t4 is less than the second start threshold, the measurement for the non-serving cell is started.

Continuing to take FIG. 4 as an example, the plurality of start thresholds may include a third distance-based start threshold a fourth distance-based start threshold. The third start threshold is greater than the fourth start threshold. The third start threshold may be determined as the start threshold at time t1. When the distance from the terminal device to the center of the serving cell or the satellite corresponding to the serving cell at time t1 is less than the third enable threshold, the measurement for the non-serving cell is not started. At time t4, the fourth start threshold may be determined as the start threshold. When the distance between the terminal device and the center of the serving cell or the satellite corresponding to the serving cell at time t4 is greater than the fourth start threshold, the measurement for the non-serving cell is started.

According to the start control method for a measurement for a non-serving cell in embodiments of the disclosure, the start configuration information from the network device or the protocol convention is obtained, the corresponding start threshold is determined according to the location information and the start configuration information, in which the location information includes the location information of the terminal device and the location information of the reference point of the serving cell where the terminal device is located, and it is determined whether to start the measurement for the non-serving cell according to the start threshold. Therefore, the influence of the location information on the start threshold may be considered, so that the determined start threshold is more accurate, thereby avoiding measurements for unnecessary non-serving cells and reducing the throughput loss and energy consumption of the terminal device.

Figure 5:
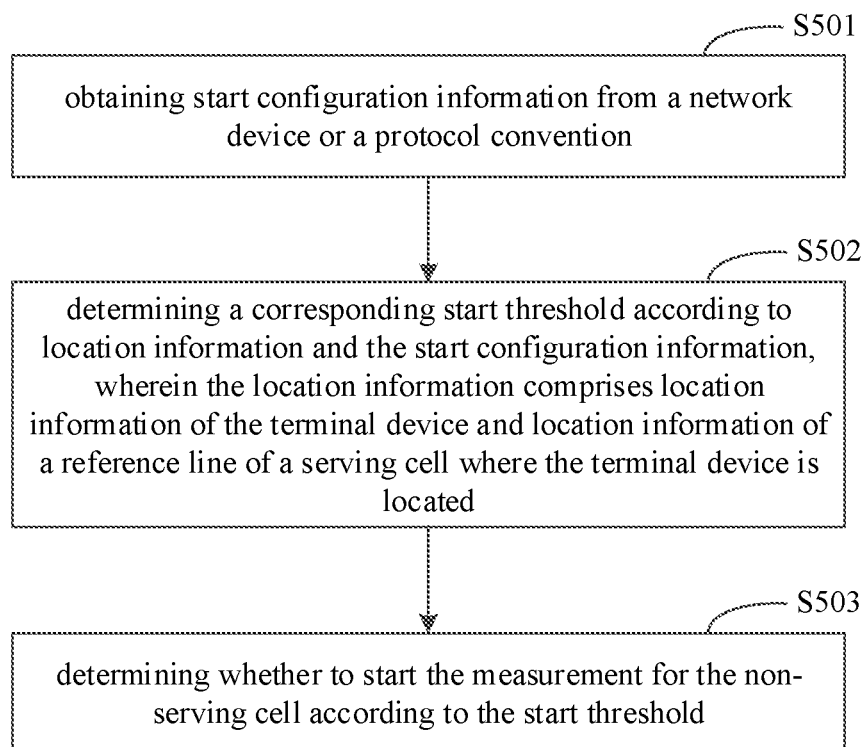
FIG. 5 is a schematic flowchart of another start control method for a measurement for a non-serving cell according to some embodiments of the disclosure.

FIG. 5 is a schematic flowchart of another start control method for a measurement for a non-serving cell according to some embodiments of the disclosure. The method is performed by the terminal device. As illustrated in FIG. 5, the start control method for a measurement for a non-serving cell includes the following steps.

S501, start configuration information from a network device or a protocol convention is obtained.

In some embodiments of the disclosure, step S501 may be implemented in any one of the embodiments of the disclosure, which is not limited in the embodiments of the disclosure and will not be described again.

S502, a corresponding start threshold is determined according to location information and the start configuration information. The location information includes location information of the terminal device and location information of a reference line of a serving cell where the terminal device is located.

In some embodiments of the disclosure, the corresponding start threshold may be determined according to the location information of the terminal device, the location information of the reference line of the serving cell where the terminal device is located in the location information, and the start configuration information, which may include at least one of the following possibilities implementations.

Implementation 1, a relative location relationship between the terminal device and the reference line of the serving cell where the terminal device is located is determined according to the location information of the terminal device and the location information of the reference line, and the start threshold is determined from the plurality of start thresholds in the start configuration information according to the relative location relationship.

In an implementation manner, the reference line of the serving cell is a straight line perpendicular to a moving direction of the serving cell and passing through the center of the serving cell. The plurality of start thresholds may include a first measurement-based start threshold and a second measurement-based start threshold. The first start threshold is smaller than the second start threshold.

The start threshold is determined from the plurality of start thresholds in the start configuration information according to the relative location relationship, which may include that when the location of the terminal device relative to the reference line is the same as the moving direction of the serving cell, it indicates that the distance between the terminal device and the center of the serving cell decreases with the time and the first start threshold is determined as the start threshold, that is, when the distance between the terminal device and the center of the serving cell becomes smaller with time, the smaller value among the plurality of measurement-based start thresholds is determined as the start threshold.

The start threshold is determined from the plurality of start thresholds in the start configuration information according to the relative location relationship, which may include that when the location of the terminal device relative to the reference line is opposite to the moving direction of the serving cell, it indicates that the distance between the terminal device and the center of the serving cell increases with the time and the second start threshold is determined as the start threshold, that is, when the distance between the terminal device and the center of the serving cell becomes smaller with time, the larger value among the plurality of measurement-based start thresholds is determined as the start threshold.

Figure 6:
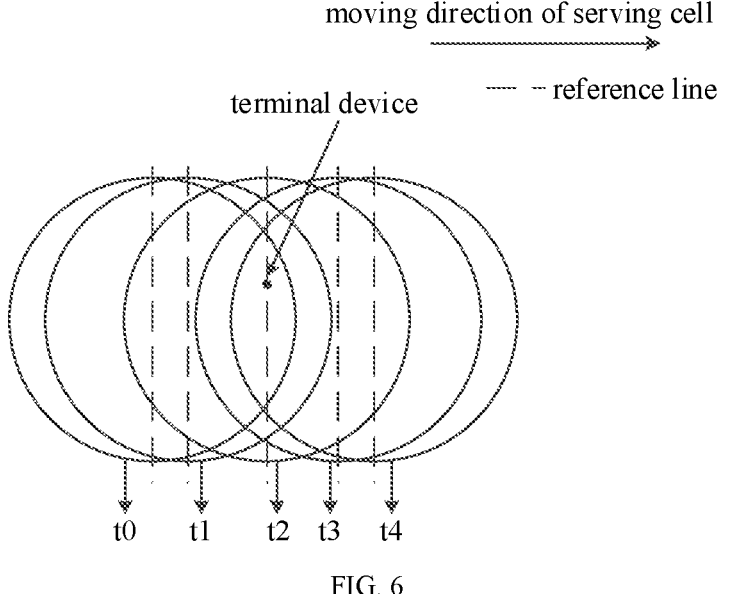
FIG. 6 is a schematic diagram of another start control method for a measurement for a non-serving cell according to some embodiments of the disclosure.

For example, as illustrated in FIG. 6, from time t0 to time t2, the moving direction of the serving cell is moving to the right, and from time t0 to time t2, the location of the terminal device relative to the reference line is on the right side, which is the same as the moving direction of the serving cell and the first start threshold may be determined as the start threshold. From time t2 to time t4, the location of the terminal device relative to the reference line is on the left side, which is opposite to the moving direction of the serving cell and the second start threshold may be determined as the start threshold.

In an implementation manner, the reference line of the serving cell is a straight line perpendicular to the moving direction of the serving cell and passing through the center of the serving cell. The plurality of start thresholds may include a third distance-based start threshold and a fourth distance-based start threshold. The third start threshold is greater than the fourth start threshold.

The start threshold is determined from the plurality of start thresholds in the start configuration information according to the relative location relationship, which may include that when the location of the terminal device relative to the reference line is the same as the moving direction of the serving cell, it indicates that the distance between the terminal device and the center of the serving cell decreases with the time and the third start threshold is determined as the start threshold, that is, when the distance between the terminal device and the center of the serving cell becomes smaller with time, the larger value among the plurality of distance-based start thresholds is determined as the start threshold.

The start threshold is determined from the plurality of start thresholds in the start configuration information according to the relative location relationship, which may include that when the location of the terminal device relative to the reference line is opposite to the moving direction of the serving cell, it indicates that the distance between the terminal device and the center of the serving cell increases with the time and the fourth start threshold is determined as the start threshold, that is, when the distance between the terminal device and the center of the serving cell becomes greater with time, the smaller value among the plurality of distance-based start thresholds is determined as the start threshold.

For example, continuing to take FIG. 6 as an example, the moving direction of the serving cell is moving to the right. From time t0 to time t2, the location of the terminal device relative to the reference line is on the right side, which is the same as the moving direction of the serving cell and the third start threshold is determined as the start threshold. From time t2 to time t4, the location of the terminal device relative to the reference line is on the left side, which is opposite to the moving direction of the serving cell and the fourth start threshold is determined as the start threshold.

Implementation 2, a distance between the terminal device and the reference line is calculated according to the location information of the terminal device and the location information of the reference line, and the start threshold is determined from the plurality of start thresholds according to a change of the distance.

In an implementation manner, the reference line of the serving cell is a straight line perpendicular to the moving direction of the serving cell and passing through the center of the serving cell. The plurality of start thresholds may include a first measurement-based start threshold and a second measurement-based start threshold. The first start threshold is smaller than the second start threshold.

The start threshold is determined from the plurality of start thresholds in the start configuration information according to the change of the distance, which may include that when the distance at the current moment is smaller than the distance at the previous moment, it indicates that the distance between the terminal device and the center of the serving cell decreases with time and the first start threshold is determined as the start threshold, that is, when the distance between the terminal device and the center of the serving cell becomes smaller with time, the smaller value among the plurality of measurement-based start thresholds is determined as the start threshold.

The start threshold is determined from the plurality of start thresholds in the start configuration information according to the change of the distance, which may include that when the distance at the current moment is greater than the distance at the previous moment, it indicates that the distance between the terminal device and the center of the serving cell increases with time and the second start threshold is determined as the start threshold, that is, when the distance between the terminal device and the center of the serving cell becomes greater with time, the larger value among the plurality of measurement-based start thresholds is determined as the start threshold.

For example, continuing to take FIG. 6 as an example, from time t0 to time t2, as the serving cell moves, the distance between the terminal device and the center of the serving cell decreases with time and the first start threshold may be determined as the start threshold. From time t2 to time t4, as the serving cell moves, the distance between the terminal device and the center of the serving cell increases with time and the second start threshold may be determined as the start threshold.

In an implementation manner, the reference line of the serving cell is a straight line perpendicular to the moving direction of the serving cell and passing through the center of the serving cell. The plurality of start thresholds may include a third distance-based start threshold and a fourth distance-based start threshold. The third start threshold is greater than the fourth start threshold.

The start threshold is determined from the plurality of start thresholds in the start configuration information according to the change of the distance, which may include that when the distance at the current moment is smaller than the distance at the previous moment, it indicates that the distance between the terminal device and the center of the serving cell decreases with time and the third start threshold is determined as the start threshold, that is, when the distance between the terminal device and the center of the serving cell becomes smaller with time, the larger value among the plurality of distance-based start thresholds is determined as the start threshold.

The start threshold is determined from the plurality of start thresholds in the start configuration information according to the change of the distance, which may include that the distance at the current moment is greater than the distance at the previous moment, it indicates that the distance between the terminal device and the center of the serving cell increases with time. The fourth start threshold is determined as the start threshold, that is, when the distance between the terminal device and the center of the serving cell becomes greater with time, the smaller value among the plurality of distance-based start thresholds is determined as the start threshold.

For example, continuing to take FIG. 6 as an example, from time t0 to time t2, as the serving cell moves, the distance between the terminal device and the center of the serving cell decreases with time and the third start threshold may be determined as the start threshold. From time t2 to time t4, as the serving cell moves, the distance between the terminal device and the center of the serving cell increases with time and the fourth start threshold may be determined as the start threshold.

Implementation 3, a vector formed by the terminal device and a vertical foot of the terminal device to the reference line is calculated according to the location information of the terminal device and the location information of the reference line, and the start threshold from the plurality of start thresholds is determined according to the vector.

In an implementation manner, the reference line of the serving cell is a straight line perpendicular to the moving direction of the serving cell and passing through the center of the serving cell. The plurality of start thresholds may include a first measurement-based start threshold and a second measurement-based start threshold. The first start threshold is smaller than the second start threshold. The vector starts from the vertical foot and ends at the terminal device.

The start threshold is determined from the plurality of start thresholds in the start configuration information according to the vector, which may include that when a projection of the vector in a moving direction of the serving cell is positive, it indicates that the distance between the terminal device and the center of the serving cell decreases with time and the first start threshold is determined as the start threshold, that is, when the distance between the terminal device and the center of the serving cell becomes smaller with time, the smaller value among the plurality of measurement-based start thresholds is determined as the start threshold.

The start threshold is determined from the plurality of start thresholds in the start configuration information according to the vector, which may include that when a projection of the vector in a moving direction of the serving cell is negative, it indicates that the distance between the terminal device and the center of the serving cell increases with time and the second start threshold is determined as the start threshold, that is, when the distance between the terminal device and the center of the serving cell becomes smaller with time, the larger value among the plurality of measurement-based start thresholds is determined as the start threshold.

For example, continuing to take FIG. 6 as an example, from time t0 to time t2, as the serving cell moves, the projection of the vector on the moving direction of the serving cell is positive and the first start threshold may be determined as the start threshold. From time t2 to time t4, as the serving cell moves, the projection of the vector on the moving direction of the serving cell is negative and the second start threshold may be determined as the start threshold.

In an implementation manner, the reference line of the serving cell is a straight line perpendicular to the moving direction of the serving cell and passing through the center of the serving cell. The plurality of start thresholds may include a third distance-based start threshold and a fourth distance-based start threshold. The third start threshold is greater than the fourth start threshold. The vector starts from the vertical foot and ends at the terminal device.

The start threshold is determined from the plurality of start thresholds in the start configuration information according to the vector, which may include that when a projection of the vector in a moving direction of the serving cell is positive, it indicates that the distance between the terminal device and the center of the serving cell decreases with time and the third start threshold is determined as the start threshold, that is, when the distance between the terminal device and the center of the serving cell becomes smaller with time, the larger value among the plurality of distance-based start thresholds is determined as the start threshold.

The start threshold is determined from the plurality of start thresholds in the start configuration information according to the vector, which may include that when a projection of the vector in a moving direction of the serving cell is negative, it indicates that the distance between the terminal device and the center of the serving cell increases with time and the fourth start threshold is determined as the start threshold, that is, when the distance between the terminal device and the center of the serving cell becomes greater with time, the smaller value among the plurality of distance-based start thresholds is determined as the start threshold.

For example, continuing to take FIG. 6 as an example, from time t0 to time t2, as the serving cell moves, the projection of the vector on the moving direction of the serving cell is positive and the third start threshold may be determined as the start threshold. From time t2 to time t4, as the serving cell moves, the projection of the vector on the moving direction of the serving cell is negative and the fourth start threshold may be determined as the start threshold.

Implementation 4, the vector formed by the terminal device and the vertical foot of the terminal device to the reference line is calculated according to the location information of the terminal device and the location information of the reference line, and the start threshold is determined by adopting the calculation function of the start threshold in the start configuration information according to the vector.

In some embodiments of the disclosure, the vector formed by the terminal device and the vertical foot of the terminal device to the reference line is calculated according to the location information of the terminal device and the location information of the reference line, and the calculation function of the start threshold in the start configuration information is used to determine the start threshold according to the vector. It may be understood that the vector may be substituted into the calculation function of the start threshold in the start configuration information to calculate the start threshold. Thus, the manner may determine the start threshold according to the vector and the calculation function of the start threshold in the start configuration information.

In an implementation manner, the start threshold may be calculated by using the calculation function of the start threshold according to the projection of the vector starting from the vertical foot and ending at the terminal device on the moving direction of the serving cell. It may be understood that, the projection may be substituted into the calculation function of the start threshold in the start configuration information to calculate the start threshold.

S503, it is determined whether to start the measurement for the non-serving cell according to the start threshold.

In some embodiments of the disclosure, step S503 may be implemented in any one of the embodiments of the disclosure, which is not limited in the embodiments of the disclosure and will not be described again.

Continue to take FIG. 6 as an example, the plurality of start thresholds may include a first measurement-based start threshold and a second measurement-based start threshold. The first start threshold is smaller than the second start threshold. The first start threshold may be determined at time t0 as the start threshold. When the measurement result of the serving cell where the terminal device is located at time t0 is greater than the first start threshold, the measurement for the non-serving cell is not started. At time t4, the second start threshold may be determined as the start threshold. When the measurement result of the serving cell where the terminal device is located at time t4 is less than the second start threshold, the measurement for the non-serving cell is started.

Continuing to take FIG. 6 as an example, the plurality of start thresholds may include a third distance-based start threshold and a fourth distance-based start threshold. The third start threshold is greater than the fourth start threshold. The third start threshold may be determined as the start threshold at time to. When the distance between the terminal device and the center of the serving cell at time t0 is less than the third start threshold, the measurement for the non-serving cell is not started. At time t4, the fourth start threshold may be determined as the start threshold. When the distance between the terminal device and the center of the serving cell at time t4 is greater than the fourth start threshold, the measurement for the non-serving cell is started.

According to the start control method for a measurement for a non-serving cell in embodiments of the disclosure, the start configuration information from the network device or the protocol convention is obtained, the corresponding start threshold is determined according to the location information and the start configuration information, in which the location information includes the location information of the terminal device and the location information of the reference line of the serving cell where the terminal device is located, and it is determined whether to start the measurement for the non-serving cell according to the start threshold. Therefore, the influence of the location information on the start threshold may be considered, so that the determined start threshold is more accurate, thereby avoiding measurements for unnecessary non-serving cells and reducing the throughput loss and energy consumption of the terminal device.

In an implementation manner, the start configuration information may include area categories of a plurality of coverage areas of cells, in which the area categories may include a start area and a non-start area. Whether to start the measurement for the non-serving cell may be determined according to the location information and the area categories of the plurality of coverage areas of cells in the start configuration information.

Determining whether to start the measurement for the non-serving cell according to the location information and the area categories of the plurality of coverage areas of cells in the start configuration information may include determining the coverage area information of the serving cell where the terminal device is located according to the location information of the terminal device, obtaining an area category corresponding to a coverage area where the terminal device is located according to the coverage area information where the terminal device is located and the area categories of the plurality of coverage areas of cells in the start configuration information; when the obtained area category corresponding to the coverage area where the terminal device is the start area, determining to start the measurement for the non-serving cell; otherwise, when the obtained area category corresponding to the coverage area where the terminal device is the not-start area, determining to not start the measurement for the non-serving cell.

Therefore, the method may directly determine whether to start the measurement for the non-serving cell according to the location information and the area categories of the plurality of coverage areas of cells in the start configuration information.

In an implementation, the start configuration information may include a time range. The time range include a start time range, a non-start time range or the like. It should be noted that, in some embodiments of the disclosure, the type of the time range is not limited too much, for example, it may include an absolute time range, such as Universal Time (UTC). In embodiments, it may be determined whether to start the measurement for the non-serving cell according to the current time and the time range.

Determining whether to start the measurement for the non-serving cell according to the current time and the time range may include determining to start the measurement for the non-serving cell when the current time is within the start time range.

Determining whether to start the measurement for the non-serving cell according to the current time and the time range may include determining not to start the measurement for the non-serving cell when the current time is within the non-start time range.

Thus, the method may directly determine whether to start the measurement for the non-serving cell according to the current time and the time range in the start configuration information.

In an implementation manner, the terminal device may obtain configuration information of a timer from the network device and determine whether to start the measurement for the non-serving cell according to the configuration information of the timer. The configuration information of the timer may include a start moment of the timer. The start moment of the timer includes but is not limited to a moment when the terminal device receives a configuration signaling for the timer from the network device, and a start moment of the timer configured by the network device. It should be noted that, in some embodiments of the disclosure, the type of the start moment of the timer is not limited too much, for example, it may be UTC.

Determining whether to start the measurement for the non-serving cell according to the configuration information of the timer may include at least one of (i) determining to start the measurement for the non-serving cell before the timer expires, (ii) determining to stop the measurement for the non-serving cell after the timer expires, (iii) determining to stop the measurement for the non-serving cell before the timer expires, (iv) determining to start the measurement for the non-serving cell after the timer expires, and (v) updating the start of the measurement for the non-serving cell after the timer expires. For example, it is determined to start the measurement for the non-serving cell before the timer expires and then it is determined stop the measurement for the non-serving cell after the timer expires; or it is determined to stop the measurement for the non-serving cell before the timer expires and then it is determined to start the measurement for the non-serving cell after the timer expires.

Therefore, the method may directly determine whether to start the measurement for the non-serving cell according to the configuration information of the timer.

FIG. 7 is a schematic flowchart of another start control method for a measurement for a non-serving cell according to some embodiments of the disclosure. The method is performed by a network device. As illustrated in FIG. 7, the start control method for a measurement for a non-serving cell includes the following step.

S701, start configuration information is sent to a terminal device, in which the start configuration information is used to determine a corresponding start threshold.

In some embodiments of the disclosure, the network device may send the start configuration information to the terminal device, in which the start configuration information is used to determine the corresponding start threshold.

In embodiments, the start configuration information includes at least one of: a plurality of start thresholds; a calculation function of the start threshold; or a correspondence between a plurality of pieces of coverage area information of cells and a plurality of start thresholds.

In an implementation manner, the start configuration information may include the plurality of start thresholds. The corresponding start threshold may be determined from the plurality of start thresholds in the start configuration information.

In an implementation manner, the start configuration information may include the calculation function of the start threshold. The corresponding start threshold may be determined according to the calculation function of the start threshold in the start configuration information.

In an implementation manner, the start configuration information may include the correspondence between a plurality of pieces of coverage area information of cells and a plurality of start thresholds. The corresponding start threshold may be determined according to the correspondence between a plurality of pieces of coverage area information of cells and a plurality of start thresholds in the start configuration information.

In an implementation manner, the corresponding start threshold is determined according to location information and the start configuration information. The location information includes at least one of: location information of the terminal device; location information of a serving cell where the terminal device is located; or ephemeris information of a serving satellite corresponding to the serving cell. It should be noted that the serving cell refers to a cell to which the terminal device is currently connected and the serving satellite refers to a satellite to which the serving cell is currently connected.

In an implementation manner, the network device may send a broadcast or a signaling to the terminal device and the broadcast or signaling is used to obtain at least one of: the start configuration information, the location information of the serving cell, and the ephemeris information of the serving satellite.

In an implementation manner, the location information of the serving cell includes at least one of: coverage area information of the serving cell; location information of a reference point of the serving cell; or location information of a reference line of the serving cell.

The coverage area information of the serving cell may include at least one of: a circle center and a radius of a circular area corresponding to the serving cell, in which the circle center is the center of the serving cell and the radius is used to indicate a size of the serving cell; or a set of coordinates for indicating boundaries of the serving cell.

The reference point of the serving cell may include the center of the serving cell. The reference line of the serving cell may include a straight line perpendicular to a moving direction of the serving cell. The reference line of the serving cell may pass through the center of the serving cell.

In an implementation manner, the corresponding start threshold is determined from a plurality of start thresholds in the start configuration information according to the location information; or the corresponding start threshold is determined according to the location information and a calculation function of the start threshold in the start configuration information; or the corresponding start threshold is determined according to the location information and a correspondence between a plurality of pieces of coverage area information of cells and a plurality of start thresholds in the start configuration information.

In embodiments, the start threshold corresponding to a coverage area where the terminal device is located is determined according to coverage area information where the terminal device is located and a correspondence between a plurality of pieces of coverage area information of cells and a plurality of start thresholds, in which the coverage area information of the serving cell where the terminal device is located is determined according to location information of the terminal device.

In an implementation manner, the corresponding start threshold is determined by, according to location information of the terminal device and location information of a reference point of a serving cell where the terminal device is located, calculating a distance between the terminal device and the reference point, and determining from a plurality of start thresholds in the start configuration information according to a change of the distance.

Or the corresponding start threshold is determined by calculating a vector formed by the terminal device and the reference point according to the location information of the terminal device and the location information of the reference point, and determining from the plurality of start thresholds according to the vector.

Or the corresponding start threshold is determined by calculating the vector formed by the terminal device and the reference point according to the location information of the terminal device and the location information of the reference point, and determining by adopting a calculation function of the start threshold in the start configuration information according to the vector.

In an implementation manner, the corresponding start threshold is determined by, according to location information of the terminal device and location information of a reference line of a serving cell where the terminal device is located, determining a relative location relationship between the terminal device and the reference line, and determining from a plurality of start thresholds in the start configuration information according to the relative location relationship.

Or the corresponding start threshold is determined by calculating a distance between the terminal device and the reference line according to the location information of the terminal device and the location information of the reference line, and determining from the plurality of start thresholds according to a change of the distance.

Or the corresponding start threshold is determined by calculating a vector formed by the terminal device and a vertical foot of the terminal device to the reference line according to the location information of the terminal device and the location information of the reference line, and determining from the plurality of start thresholds according to the vector.

Or the corresponding start threshold is determined by calculating the vector formed by the terminal device and the vertical foot of the terminal device to the reference line according to the location information of the terminal device and the location information of the reference line, and determining by adopting a calculation function of the start threshold in the start configuration information according to the vector.

In an implementation manner, the corresponding start threshold is determined according to time information and the start configuration information, and the time information includes at least one of: a start moment and an end moment that the serving cell serves the terminal device; a duration that the serving cell serves the terminal device; or a remaining duration that the serving cell serves the terminal device. It should be noted that the start moment and the end moment that the serving cell serves the terminal device includes the start moment that the serving cell serves the terminal device and the end moment that the serving cell serves the terminal device. The remaining duration that the serving cell serves the terminal device may include a duration of the terminal device reaching the boundary of the serving cell.

In an implementation manner, the corresponding start threshold is determined from a plurality of start thresholds in the start configuration information according to the time information; or the corresponding start threshold is determined according to the time information and a calculation function of the start threshold in the start configuration information.

In an implementation, the start threshold is used to determine whether to start the measurement for the non-serving cell.

In an implementation, the start threshold includes at least one of: a measurement-based start threshold; a distance-based start threshold; or a time-based start threshold.

According to the start control method for a measurement for a non-serving cell, provided in the disclosure, the start configuration information is sent to the terminal device, in which the start configuration information is used to determine the corresponding start threshold. In this way, the network device may send the start configuration information to the terminal device, and the start configuration information is used to determine the corresponding start threshold, so that the terminal device may determine the start threshold according to the start configuration information and the determined start threshold is more accurate, thereby avoiding measurements for unnecessary non-serving cells and reducing the throughput loss and energy consumption of the terminal device.

In the above embodiments in the disclosure, the methods provided in the above embodiments in the disclosure are respectively introduced from perspectives of the network device and the terminal device. In order to realize the functions in the methods in the above embodiments of the disclosure, the network device and the terminal device may include a hardware structure and a software module to realize the functions in the form of hardware structure, software module or hardware structure plus software module. A certain function among the functions may be performed in the form of hardware structure, software module or hardware structure plus software module.

FIG. 8 is a schematic block diagram of a start control apparatus for a measurement for a non-serving cell according to some embodiments of the disclosure.

As illustrated in FIG. 8, the start control apparatus 800 for a measurement for a non-serving cell includes a transceiver module 801 and a processing module 802.

The transceiver module 801 is configured to obtain start configuration information from a network device or a protocol convention.

The processing module 802 is configured to determine a corresponding start threshold according to location information and the start configuration information or determine a corresponding start threshold according to time information and the start configuration information.

The processing module 802 is further configured to determine whether to start the measurement for the non-serving cell according to the start threshold.

In an implementation manner, the start configuration information includes at least one of: a plurality of start thresholds; a calculation function of the start threshold; or a correspondence between a plurality of pieces of coverage area information of cells and a plurality of start thresholds.

In an implementation manner, the start threshold includes at least one of: a measurement-based start threshold; a distance-based start threshold; or a time-based start threshold.

In an implementation manner, the location information includes at least one of: location information of the terminal device; location information of a serving cell where the terminal device is located; or ephemeris information of a serving satellite corresponding to the serving cell.

In an implementation manner, the location information of the serving cell includes at least one of: coverage area information of the serving cell; location information of a reference point of the serving cell; or location information of a reference line of the serving cell.

In an implementation manner, the time information includes at least one of: a start moment and an end moment that the serving cell serves the terminal device; a duration that the serving cell serves the terminal device; or a remaining duration that the serving cell serves the terminal device.

In an implementation manner, the processing module 802 is specifically configured to at least one of: determine the start threshold from a plurality of start thresholds in the start configuration information according to the location information; determine the start threshold according to the location information and a calculation function of the start threshold in the start configuration information; or determine the start threshold according to the location information and a correspondence between a plurality of pieces of coverage area information of cells and a plurality of start thresholds in the start configuration information.

In an implementation manner, the processing module 802 is specifically configured to at least one of: determine the start threshold from a plurality of start thresholds in the start configuration information according to the time information; or determine the start threshold according to the time information and a calculation function of the start threshold in the start configuration information.

In an implementation manner, the processing module 802 is specifically configured to at least one of: a measurement result of a serving cell where the terminal device is located being greater than a corresponding measurement-based start threshold, and not start the measurement for the non-serving cell; a distance from the terminal device to a center of the serving cell being less than a corresponding distance-based start threshold, and not start the measurement for the non-serving cell; a distance from the terminal device to a corresponding serving satellite being less than the corresponding distance-based start threshold, and not start the measurement for the non-serving cell; or a remaining duration that the serving cell serves the terminal device being greater than the corresponding time-based start threshold, and not start the measurement for the non-serving cell.

In an implementation manner, the processing module 802 is specifically configured to: determine coverage area information of a serving cell where the terminal device is located according to location information of the terminal device; and determine the start threshold corresponding to a coverage area where the terminal device is located according to the coverage area information where the terminal device is located and a correspondence between a plurality of pieces of coverage area information of cells and a plurality of start thresholds.

In an implementation manner, the processing module 802 is specifically configured to at least one of: according to location information of the terminal device and location information of a reference point of a serving cell where the terminal device is located, calculate a distance between the terminal device and the reference point, and determine the start threshold from a plurality of start thresholds in the start configuration information according to a change of the distance; calculate a vector formed by the terminal device and the reference point according to the location information of the terminal device and the location information of the reference point, and determine the start threshold from the plurality of start thresholds according to the vector; or calculate the vector formed by the terminal device and the reference point according to the location information of the terminal device and the location information of the reference point, and determine the start threshold by adopting a calculation function of the start threshold in the start configuration information according to the vector.

In an implementation manner, the processing module 802 is specifically configured to at least one of: according to location information of the terminal device and location information of a reference line of a serving cell where the terminal device is located, determine a relative location relationship between the terminal device and the reference line, and determine the start threshold from a plurality of start thresholds in the start configuration information according to the relative location relationship; calculate a distance between the terminal device and the reference line according to the location information of the terminal device and the location information of the reference line, and determine the start threshold from the plurality of start thresholds according to a change of the distance; calculate a vector formed by the terminal device and a vertical foot of the terminal device to the reference line according to the location information of the terminal device and the location information of the reference line, and determine the start threshold from the plurality of start thresholds according to the vector; or calculate the vector formed by the terminal device and the vertical foot of the terminal device to the reference line according to the location information of the terminal device and the location information of the reference line, and determine the start threshold by adopting a calculation function of the start threshold in the start configuration information according to the vector.

In an implementation manner, the transceiver module 801 is further configured to: obtain at least one of: the start configuration information, the location information of the serving cell, and the ephemeris information of the serving satellite, by receiving a broadcast or a signaling from the network device.

According to the start control apparatus for a measurement for a non-serving cell, provided in the disclosure, the start configuration information from the network device or the protocol convention is obtained, the corresponding start threshold is determined according to the location information and the start configuration information or the corresponding start threshold is determined according to the time information and the start configuration information, and it is determined whether to start the measurement for the non-serving cell according to the start threshold. Therefore, the influence of the location information or the time information on the start threshold may be considered, so that the determined start threshold may be more accurate, thereby avoiding measurements for unnecessary non-serving cells and reducing the throughput loss and energy consumption of the terminal device.

FIG. 9 is a schematic block diagram of another start control apparatus for a measurement for a non-serving cell according to some embodiments of the disclosure.

As illustrated in FIG. 9, the start control apparatus 900 for a measurement for a non-serving cell includes a transceiver module 901.

The transceiver module 901 is configured to send start configuration information to a terminal device, in which the start configuration information is used to determine a corresponding start threshold.

In an implementation manner, the start configuration information includes at least one of: a plurality of start thresholds; a calculation function of the start threshold; or a correspondence between a plurality of pieces of coverage area information of cells and a plurality of start thresholds.

In an implementation manner, the start threshold includes at least one of: a measurement-based start threshold; a distance-based start threshold; or a time-based start threshold.

In an implementation manner, the corresponding start threshold is determined according to location information and the start configuration information, and the location information includes at least one of: location information of the terminal device; location information of a serving cell where the terminal device is located; or ephemeris information of a serving satellite corresponding to the serving cell.

In an implementation manner, the location information of the serving cell includes at least one of: coverage area information of the serving cell; location information of a reference point of the serving cell; or location information of a reference line of the serving cell.

In an implementation manner, the corresponding start threshold is determined according to time information and the start configuration information, and the time information includes at least one of: a start moment and an end moment that the serving cell serves the terminal device; a duration that the serving cell serves the terminal device; or a remaining duration that the serving cell serves the terminal device.

In an implementation manner, the corresponding start threshold is determined from a plurality of start thresholds in the start configuration information according to the location information; or the corresponding start threshold is determined according to the location information and a calculation function of the start threshold in the start configuration information; or the corresponding start threshold is determined according to the location information and a correspondence between a plurality of pieces of coverage area information of cells and a plurality of start thresholds in the start configuration information.

In an implementation manner, the corresponding start threshold is determined from a plurality of start thresholds in the start configuration information according to the time information; or the corresponding start threshold is determined according to the time information and a calculation function of the start threshold in the start configuration information In an implementation manner, the start threshold is used to determine whether to start the measurement for the non-serving cell.

In an implementation manner, the start threshold corresponding to a coverage area where the terminal device is located is determined according to coverage area information where the terminal device is located and a correspondence between a plurality of pieces of coverage area information of cells and a plurality of start thresholds, in which the coverage area information of the serving cell where the terminal device is located is determined according to location information of the terminal device.

In an implementation manner, the corresponding start threshold is determined by, according to location information of the terminal device and location information of a reference point of a serving cell where the terminal device is located, calculating a distance between the terminal device and the reference point, and determining from a plurality of start thresholds in the start configuration information according to a change of the distance; or the corresponding start threshold is determined by calculating a vector formed by the terminal device and the reference point according to the location information of the terminal device and the location information of the reference point, and determining from the plurality of start thresholds according to the vector; or the corresponding start threshold is determined by calculating the vector formed by the terminal device and the reference point according to the location information of the terminal device and the location information of the reference point, and determining by adopting a calculation function of the start threshold in the start configuration information according to the vector.

In an implementation manner, the corresponding start threshold is determined by, according to location information of the terminal device and location information of a reference line of a serving cell where the terminal device is located, determining a relative location relationship between the terminal device and the reference line, and determining from a plurality of start thresholds in the start configuration information according to the relative location relationship; or the corresponding start threshold is determined by calculating a distance between the terminal device and the reference line according to the location information of the terminal device and the location information of the reference line, and determining from the plurality of start thresholds according to a change of the distance; or the corresponding start threshold is determined by calculating a vector formed by the terminal device and a vertical foot of the terminal device to the reference line according to the location information of the terminal device and the location information of the reference line, and determining from the plurality of start thresholds according to the vector; or the corresponding start threshold is determined by calculating the vector formed by the terminal device and the vertical foot of the terminal device to the reference line according to the location information of the terminal device and the location information of the reference line, and determining by adopting a calculation function of the start threshold in the start configuration information according to the vector.

In an implementation manner, the transceiver module 901 is further configured to: send a broadcast or a signaling to the terminal device, the broadcast or signaling for obtaining at least one of: the start configuration information, the location information of the serving cell, and the ephemeris information of the serving satellite.

According to the start control apparatus for a measurement for a non-serving cell, provided in the disclosure, the start configuration information is sent to the terminal device, in which the start configuration information is used to determine the corresponding start threshold. In this way, the network device may send the start configuration information to the terminal device, and the start configuration information is used to determine the corresponding start threshold, so that the terminal device may determine the start threshold according to the start configuration information and the determined start threshold is more accurate, thereby avoiding measurements for unnecessary non-serving cells and reducing the throughput loss and energy consumption of the terminal device.

Figure 10:
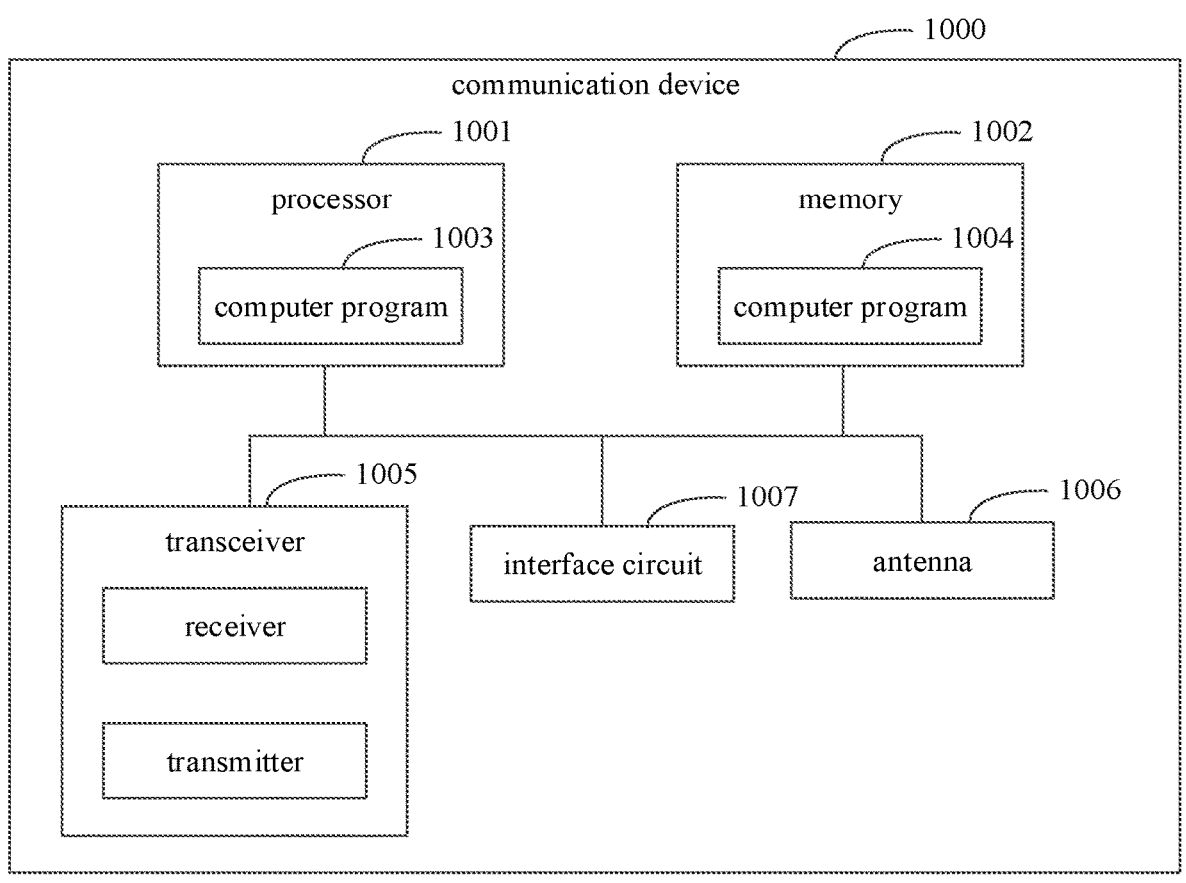
FIG. 10 is a schematic block diagram of a communication device according to some embodiments of the disclosure.

FIG. 10 is a schematic block diagram of a communication device 1000 according to some embodiments of the disclosure. The communication device 1000 may be a network device, or a terminal device, or a chip, a chip system or a processor that supports the network device to implement the above methods, or a chip, a chip system or a processor that supports the terminal device to implement the above methods, or the like. The device may be used to implement the methods described in the foregoing method embodiments, and for details, reference may be made to the descriptions in the foregoing method embodiments.

The communication device 1000 may include one or more processors 1001. The processor 1001 may be a general-purpose processor, a special-purpose processor, or the like. For example, it may be a baseband processor or a central processing unit. The baseband processor may be used to process communication protocols and communication data. The central processing unit may be used to control the communication device (such as a base station, a baseband chip, a terminal device, a terminal device chip, a DU, a CU, or the like), execute a computer program, process data of the computer program, and the like.

Communication device 1000 may further include one or more memories 1002 on which a computer program 1004 may be stored. The processor 1001 executes the computer program 1004, so that the communication device 1000 executes the methods described in the above method embodiments. Data may also be stored in the memory 1002. The communication device 1000 and the memory 1002 may be provided separately or integrated together.

Communication device 1000 may further include a transceiver 1005 and an antenna 1006. The transceiver 1005 may be referred to as a transceiver unit, a transceiver, a transceiver circuit, or the like, which is used to implement a transceiver function. The transceiver 1005 may include a receiver and a transmitter. The receiver may be called a receiver or a receiving circuit or the like, for implementing a receiving function. The transmitter may be called a transmitter or a transmitting circuit or the like for implementing a transmitting function.

Communication device 1000 may further include one or more interface circuits 1007. The interface circuit 1007 is used to receive code instructions and transmit them to the processor 1001. The processor 1001 executes the code instructions to cause the communication device 1000 to perform the methods described in the above method embodiments.

The communication device 1000 is a terminal device: the processor 1001 is used for executing steps S202 and S203 in FIG. 2, steps S302 and S303 in FIG. 3, and steps S502 and S503 in FIG. 5, and the like; and the transceiver 1005 is used for executing step S201 in FIG. 3, step S301 in FIG. 3, step S501 in FIG. 5, and the like.

The communication device 1000 is a network device: the transceiver 1005 is used to execute step S701 in FIG. 7 and the like.

In an implementation, the processor 1001 may include a transceiver for implementing receiving and transmitting functions. For example, the transceiver may be a transceiver circuit, or an interface, or an interface circuit. The transceiver circuit, or the interface, or the interface circuit for implementing receiving and transmitting functions may be separate or integrated. The above-mentioned transceiver circuit, interface, or interface circuit may be used for reading and writing code/data, or the above-mentioned transceiver circuit, interface, or interface circuit may be used for signal transmission.

In an implementation manner, the processor 1001 may store a computer program 1003, and the computer program 1003 runs on the processor 1001 to enable the communication device 1000 to execute the methods described in the above method embodiments. The computer program 1003 may be embodied in the processor 1001, in which the processor 1001 may be implemented by hardware.

In an implementation manner, the communication device 1000 may include a circuit. The circuit may implement the functions of sending or receiving or communicating in the foregoing method embodiments. The processor and the transceiver described in the disclosure may be implemented in an integrated circuits (IC), an analog IC, a radio frequency integrated circuit (RFIC), a mixed-signal IC, an application specific integrated circuit (ASIC), a printed circuit board (PCB), electronic equipment, or the like. The processor and the transceiver may also be fabricated using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device but the scope of the communication device described in the disclosure is not limited thereto and the structure of the communication device may not be limited by FIG. 10. The communication device may be a stand-alone device or part of a larger device. For example, the communication means may be:

(1) a stand-alone IC, or a chip, or a chip system, or a chip subsystem;

(2) a set of one or more ICs, the set may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handset, a mobile unit, an in-vehicle device, a network device, a cloud device, an artificial intelligence device, etc.;

(6) others.

Figure 11:
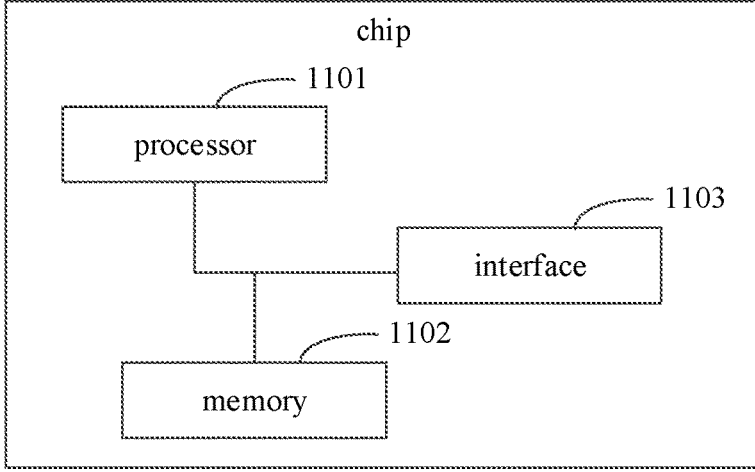
FIG. 11 is a schematic block diagram of a chip according to some embodiments of the disclosure.

For the case that the communication device may be the chip or the chip system, reference may be made to the schematic structural diagram of the chip in FIG. 11. The chip in FIG. 11 includes a processor 1101 and an interface 1102. The number of processors 1101 may be one or more and the number of interfaces 1102 may be multiple.

For the case where the chip is used to implement functions of the terminal device in the embodiments of the disclosure:

The interface 1102 is used to execute step S201 in FIG. 2, step S301 in FIG. 3, step S501 in FIG. 5 and the like.

For the case where the chip is used to implement functions of the network device in the embodiments of the disclosure:

The interface 1102 is used to execute step S701 in FIG. 7 and the like.

The chip may further include a memory 1103. The memory 1103 is used to store necessary computer programs and data.

Those skilled in the art may also understand that various illustrative logical blocks and steps listed in the embodiments of the disclosure may be implemented in electronic hardware, computer software, or a combination thereof. Whether such function is implemented in hardware or software depends on specific applications and overall system design requirements. Those skilled in the art may use various manners to implement functions for each specific application, but such implementation should not be understood as exceeding the protection scope of the embodiments of the disclosure.

Some embodiments of the disclosure further provide a communication system. The system includes a communication device as a terminal device (such as the terminal device in the foregoing method embodiments) and a communication device as a network device in the foregoing embodiments. Or the system includes a communication device as a terminal device (such as the terminal device in the foregoing method embodiments) and a communication device as a network device in the foregoing embodiments.

The disclosure also provides a computer-readable storage medium on which instructions are stored, and when the instructions are executed by a computer, functions of any of the above method embodiments are realized.

The disclosure also provides a computer program product, which realizes functions of any of the above method embodiments when the computer program product is executed by a computer.

In the above-mentioned embodiments, it may be implemented in whole or in part by software, hardware, firmware, or any combination thereof. When it is implemented in software, it may be implemented in whole or in part in a form of computer program product. The computer program product includes one or more computer programs. When the computer programs are loaded and executed on the computer, flows or functions according to the embodiments of the disclosure may be generated in whole or in part. The computer may be a general purpose computer, a special purpose computer, a computer network, or other programmable device. The computer programs may be stored on a computer-readable storage medium or transferred from one computer-readable storage medium to another computer-readable storage medium, for example, the computer programs may be transferred from a website site, a computer, a server, or a data center over a wire (e.g. coaxial cable, optical fiber, digital subscriber line (DSL)) or wireless (e.g. infrared, wireless, microwave) means to another website site, another computer, another server, or another data center. The computer-readable storage medium may be any available medium that may be accessed by a computer or a data storage device such as a server, a data center, or the like that includes an integration of one or more available media. The available medium may be a magnetic medium (e.g., floppy disk, hard disk, magnetic tape), an optical medium (e.g., high-density digital video disc (DVD)), a semiconductor medium (e.g., solid state disk (SSD)), or the like.

Those skilled in the art may understand that the first, second, and other numeral numbers involved in the disclosure are only for the convenience of description, and are not used to limit the scope of the embodiments of the disclosure, which also represent a sequence.

At least one in this disclosure may also be described as one or more, which is not limited in this disclosure. A plurality of or multiple in this disclosure may be two, three, four, or more, which is not limited in this disclosure. In the embodiments of the disclosure, for a type of technical features, the technical features are distinguished by "first", "second", "third", "A", "B", "C" and "D", etc. There is no order or order of magnitude for the technical features described in "first", "second", "third", "A", "B", "C" and "D", etc.

The corresponding relationships shown in each table in this disclosure may be configured or predefined. Information values in each table are only examples and may be configured with other values, which are not limited in this disclosure. When configuring the corresponding relationships between the information and each parameter, it is not necessarily required to configure all the corresponding relationships indicated in each table. For example, in each table in this disclosure, the corresponding relationships shown in some rows may not be configured. For another example, appropriate deformation adjustments may be made based on each table, such as splitting, merging. The names of the parameters shown in the headings in each tables may also adopt other names that may be understood by the communication device, and the values or representations of the parameters may also be other values or representations that the communication device may understand. When each table is implemented, other data structures may also be used, for example, an array, a queue, a container, a stack, a linear table, a pointer, a link list, a tree, a graph, a structure, a class, a heap, a hash table, or the like.

Predefined in this disclosure may be understood as defined, predefined, stored, pre-stored, pre-negotiated, pre-configured, cured, or pre-fired.

Those skilled in the art may realize that units and algorithm steps of each example described in conjunction with the embodiments disclosed herein may be implemented in electronic hardware, or a combination of computer software and electronic hardware. Whether these functions are performed in hardware or software depends on the specific applications and design constraints of the technical solutions. Those skilled in the art may implement the described functions using different methods for each particular application, but such implementations should not be considered beyond the scope of this disclosure.

Those skilled in the art may clearly understand that, for the convenience and brevity of description, the specific working processes of the above-described systems, devices, and units may refer to the corresponding processes in the foregoing method embodiments, which will not be repeated herein.

The above are only specific implementations of the disclosure, but the scope of the disclosure is not limited to this. Those skilled in the art who is familiar with the technical scope disclosed in the disclosure may easily think of changes or replacements, which should cover within the scope of this disclosure. Therefore, the scope of the disclosure shall be subject to the scope of the claims.

What is claimed is:

1. A start control method for a measurement for a non-serving cell in Non-terrestrial Network, performed by a user equipment (UE), comprising:

obtaining start configuration information from a network device or a protocol convention;

determining a corresponding start threshold according to location information for a serving cell of the UE and the start configuration information, wherein the start threshold includes a distance-based start threshold; and determining whether to perform the measurement for the non-serving cell according to the start threshold;

wherein determining whether to perform the measurement for the non-serving cell according to the start threshold comprises:

in a case of a distance from the UE to a reference location of the serving cell being shorter than the corresponding distance-based start threshold, and not performing the measurement for the non-serving cell.

2. The method according to claim 1, wherein the start configuration information comprises at least one of:

a plurality of start thresholds;

a calculation function of the start threshold; or a correspondence between a plurality of pieces of coverage area information of cells and a plurality of start thresholds.

3. The method according to claim 1, wherein the start threshold further comprises at least one of:

a measurement-based start threshold;

or a time-based start threshold.

4. The method according to claim 1, wherein the location information comprises at least one of:

location information of the UE;

location information of a serving cell of the UE is located;

or ephemeris information of a serving satellite corresponding to the serving cell.

5. The method according to claim 4, wherein the location information of the serving cell comprises at least one of:

coverage area information of the serving cell;

location information of a reference point of the serving cell; or location information of a reference line of the serving cell.

6. The method according to claim 4, further comprising:

obtaining at least one of: the start configuration information, the location information of the serving cell, and the ephemeris information of the serving satellite, by receiving a broadcast or a signaling from the network device.

7. The method according to claim 1, further comprising: determining a corresponding start threshold according to time information and the start configuration information, the start threshold includes a time-based start threshold, wherein the time information comprises at least one of:

a stop moment that a serving cell of the UE is located serves the UE;

a duration that the serving cell serves the UE; or a remaining duration that the serving cell serves the UE.

8. The method according to claim 7, wherein determining the corresponding start threshold according to the time information and the start configuration information comprises at least one of:

determining the start threshold from a plurality of start thresholds in the start configuration information according to the time information; or determining the start threshold according to the time information and a calculation function of the start threshold in the start configuration information.

9. The method according to claim 1, wherein determining the corresponding start threshold according to the location information for the serving cell of the UE and the start configuration information comprises at least one of:

determining the start threshold from a plurality of start thresholds in the start configuration information according to the location information;

determining the start threshold according to the location information and a calculation function of the start threshold in the start configuration information; or determining the start threshold according to the location information and a correspondence between a plurality of pieces of coverage area information of cells and a plurality of start thresholds in the start configuration information.

10. The method according to claim 1, further comprises at least one of:

in a case of a measurement result of a serving cell of the UE being greater than a corresponding measurement-based start threshold, and not performing the measurement for the non-serving cell;

in a case of a distance from the UE to a center of the serving cell being less than a corresponding distance-based start threshold, and not performing the measurement for the non-serving cell;

in a case of a distance from the UE to a corresponding serving satellite being less than the corresponding distance-based start threshold, and not performing the measurement for the non-serving cell; or in a case of a remaining duration that the serving cell serves the UE being greater than a corresponding time-based start threshold, and not performing the measurement for the non-serving cell.

11. The method according to claim 1, wherein determining the corresponding start threshold according to the location information and the start configuration information comprises:

determining coverage area information of a serving cell of the UE according to location information of the UE; and determining the start threshold corresponding to a coverage area where the UE is located according to the coverage area information of the serving cell where the UE is located and a correspondence between a plurality of pieces of coverage area information of cells and a plurality of start thresholds in the start configuration information.

12. The method according to claim 1, wherein determining the corresponding start threshold according to the location information and the start configuration information comprises at least one of:

calculating a distance between the UE and a reference point of a serving cell where the UE is located according to location information of the UE and location information of the reference point, and determining the start threshold from a plurality of start thresholds in the start configuration information according to a change of the distance;

calculating a vector formed by the UE and the reference point according to the location information of the UE and the location information of the reference point, and determining the start threshold from the plurality of start thresholds according to the vector; or calculating the vector formed by the UE and the reference point according to the location information of the UE and the location information of the reference point, and determining the start threshold by adopting a calculation function of the start threshold in the start configuration information according to the vector.

13. The method according to claim 1, wherein determining the corresponding start threshold according to the location information and the start configuration information comprises at least one of:

determining a relative location relationship between the UE and a reference line of a serving cell where the UE is located according to location information of the UE and location information of the reference line, and determining the start threshold from a plurality of start thresholds in the start configuration information according to the relative location relationship;

calculating a distance between the UE and the reference line according to the location information of the UE and the location information of the reference line, and determining the start threshold from the plurality of start thresholds according to a change of the distance;

calculating a vector formed by the UE and a vertical foot of the UE to the reference line according to the location information of the UE and the location information of the reference line, and determining the start threshold from the plurality of start thresholds according to the vector; or calculating a vector formed by the UE and the vertical foot of the UE to the reference line according to the location information of the UE and the location information of the reference line, and determining the start threshold by adopting a calculation function of the start threshold in the start configuration information according to the vector.

14. A start control method for a measurement for a non-serving cell in Non-terrestrial Network, performed by a network device, comprising:

sending start configuration information to a UE, wherein the start configuration information is configured to determine a corresponding start threshold, the start threshold includes a distance-based start threshold, the start threshold is configured to determine whether to perform the measurement for the non-serving cell;

wherein determining whether to perform the measurement for the non-serving cell according to the start threshold comprises:

in a case of a distance from the UE to a reference location of a serving cell being shorter than the corresponding distance-based start threshold, and not performing the measurement for the non-serving cell.

15. The method according to claim 14, wherein the start configuration information comprises at least one of:

a plurality of start thresholds;

a calculation function of the start threshold; or a correspondence between a plurality of pieces of coverage area information of cells and a plurality of start thresholds.

16. The method according to claim 14, wherein the start threshold further comprises at least one of:

a measurement-based start threshold; or a time-based start threshold.

17. The method according to claim 14, wherein the corresponding start threshold is determined according to location information and the start configuration information, and the location information comprises at least one of:

location information of the UE;

location information of a serving cell where the UE is located; or ephemeris information of a serving satellite corresponding to the serving cell.

18. The method according to claim 14, wherein the corresponding start threshold is determined according to time information and the start configuration information, and the time information comprises at least one of:

a stop moment that a serving cell where the UE is located serves the UE;

a duration that the serving cell serves the UE; or a remaining duration that the serving cell serves the UE.

19. A communication device, comprising:

a processor; and a memory storing machine-readable instructions that, when executed by the processor, caused the processor to execute the method of claim 14.

20. A communication device, comprising:

a processor; and a memory storing machine-readable instructions that, when executed by the processor, cause the processor to:

obtain start configuration information from a network device or a protocol convention;

determine a corresponding start threshold according to location information for a serving cell of the UE and the start configuration information or determine a corresponding start threshold according to time information and the start configuration information, wherein the start threshold includes a distance-based start threshold; and determine whether to perform a measurement for a non-serving cell according to the start threshold;

wherein determining whether to perform the measurement for the non-serving cell according to the start threshold comprises:

in a case of a distance from the UE to a reference location of the serving cell being shorter than the corresponding distance-based start threshold, and not performing the measurement for the non-serving cell.

\* \* \* \* \*